(12) United States Patent
Schmidt (10) Patent No.: US 7,911,956 B2
(45) Date of Patent: Mar. 22, 2011

(54) PACKET LEVEL PRIORITIZATION IN INTERCONNECTION NETWORKS

(75) Inventor: Brian K. Schmidt, Sunnyvale, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 323 days.

(21) Appl. No.: 11/829,790

(22) Filed: Jul. 27, 2007

(65) Prior Publication Data

US 2009/0028151 A1    Jan. 29, 2009

(51) Int. Cl.
*H04J 1/16* (2006.01)
(52) U.S. Cl. ............ 370/235; 370/230; 370/230.1; 370/394
(58) Field of Classification Search ......... 455/452.1, 455/452.2; 370/235, 229, 230.1, 230
See application file for complete search history.

(56) References Cited

U.S. PATENT DOCUMENTS

| | | | |
|---|---|---|---|
| 6,535,487 B1 * | 3/2003 | Biswas et al. | 370/236.1 |
| 6,721,273 B1 * | 4/2004 | Lyon | 370/235 |
| 6,985,442 B1 | 1/2006 | Wang et al. | |
| 7,636,309 B2 * | 12/2009 | Alicherry et al. | 370/230.1 |
| 2002/0154629 A1 * | 10/2002 | Lohman et al. | 370/386 |
| 2003/0221008 A1 * | 11/2003 | England et al. | 709/226 |
| 2004/0264946 A1 * | 12/2004 | Yamauchi et al. | 386/125 |
| 2006/0023750 A1 * | 2/2006 | Kim et al. | 370/473 |
| 2006/0088119 A1 * | 4/2006 | Fu et al. | 375/265 |
| 2007/0002871 A1 * | 1/2007 | Pekonen et al. | 370/395.42 |
| 2007/0071004 A1 * | 3/2007 | Hasegawa et al. | 370/390 |
| 2007/0081554 A1 * | 4/2007 | Saffre | 370/468 |
| 2007/0133535 A1 * | 6/2007 | Witt et al. | 370/390 |
| 2007/0263616 A1 * | 11/2007 | Castro et al. | 370/360 |
| 2008/0317014 A1 * | 12/2008 | Veselinovic et al. | 370/380 |

FOREIGN PATENT DOCUMENTS

| | | |
|---|---|---|
| EP | 1720318 | 11/2006 |
| WO | WO-02/41642 | 5/2002 |
| WO | WO-2005109789 | 11/2005 |

OTHER PUBLICATIONS

"8029P026PCT ISR and WO Mailed Oct. 13, 2008 for PCT/US2008/069261", (Oct. 13, 2008).
International Preliminary Report on Patentability for International Application No. PCT/US2008/06926 mailed Feb. 11, 2010.

* cited by examiner

*Primary Examiner* — Ricky Ngo
*Assistant Examiner* — Dewanda Samuel
(74) *Attorney, Agent, or Firm* — Blakely Sokoloff Taylor & Zafman (57) ABSTRACT

A method and apparatus for packet level prioritization in interconnection networks. An embodiment of an apparatus includes a transmitter to transmit a data stream to a recipient apparatus, the data stream including a plurality of data packets, the data packets including data packets of a first priority and data packets of a second priority. The apparatus further includes a network unit to direct the operation of the transmitter, the network unit to divide the data stream into multiple sub-streams, including a first sub-stream for data packets of the first priority and a second sub-stream for data packets of the second priority.

17 Claims, 8 Drawing Sheets

Fig. 8

PACKET LEVEL PRIORITIZATION IN INTERCONNECTION NETWORKS

TECHNICAL FIELD

Embodiments of the invention generally relate to the field of networks and, more particularly, to a method and apparatus for packet level prioritization in interconnection networks.

BACKGROUND

A network may interconnect various devices, including the interconnection of multiple personal media devices. The various media devices may be networked together in order to share data, increase convenience, and make fuller use of each element. For example, certain devices within a home may be connected together. In such an environment, there are multiple potential sources and users of streaming digital media content for audio, video, gaming, and other uses.

When transmitting a data stream, such as a media stream, through an interconnection network, it may be desirable to assign priorities to each class of packets that comprise the flow. During periods of congestion, the network infrastructure may drop packets due to buffer contention. In such operations, it is generally more desirable to drop packets in order of priority.

However, support for packet-level priorities is difficult to implement and not commonly available. A network infrastructure would generally be required to explicitly provide support for packet-level priorities in order to implement operations in, for example, a network of personal media devices. The complexity of implementation would make conventional processes impractical for network devices having limited resources. Further, conventional processes commonly limit the number of priority levels that are available, thus limiting the usefulness of the process if a large number of data types may be present in a data stream.

SUMMARY OF THE INVENTION

A method and apparatus are provided for packet level prioritization in interconnection networks.

In a first aspect of the invention, an apparatus may include a transmitter to transmit a data stream to a recipient apparatus, the data stream including multiple data packets, the data packets including data packets of a first priority and data packets of a second priority. The apparatus may further include a network unit to direct the operation of the transmitter, the network unit to divide the data stream into a plurality of sub-streams, including a first sub-stream for data packets of the first priority and a second sub-stream for data packets of the second priority.

In a second aspect of the invention, an apparatus includes a receiver to receive multiple data streams, where the data streams include a first data stream containing data packets of a first priority and a second data stream containing data packets of a second priority. The apparatus includes a network unit to direct the operation of the receiver, where the network unit is to determine that the multiple data streams are portions of a single data stream and to process the plurality of data streams in the same manner as the single data stream.

In a third aspect of the invention, a network includes a first network device to transmit data and a second network device to receive the data from the first network device. The data includes multiple data packets, with one or more of the data packets being of a first priority and one or more of the data packets being of a second priority. The first network device is to transmit the data packets of the first priority in one or more data streams having a first bandwidth and to transmit the data packets of the second priority in one or more data streams having a second bandwidth. The second network device is to drop one or more data streams based at least in part on the bandwidth of each data stream when interference occurs in data transmission In a fourth aspect of the invention, a method for prioritizing data packets in a network includes receiving a request for transmission of a data stream, the data stream containing a plurality of data types, each data type having a priority level. The data stream is divided into multiple data sub-streams, each sub-stream having data of a certain priority level. A bandwidth is assigned for each data sub-stream, the bandwidth of each sub-stream being based on the priority level of the data in the sub-stream, and data sub-streams are transmitted over the network.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to packet level prioritization in interconnection networks.

As used herein, "entertainment network" means an interconnection network to deliver digital media content (including music, audio/video, gaming, photos, and others) between devices. An entertainment network may include a personal entertainment network, such as a network in a household, an entertainment network in a business setting, or any other network of entertainment devices. In such a network, certain network devices may be the source of media content, such as a digital television tuner, cable set-top box, video storage server, and other source device. Other devices may display or use media content, such as a digital television, home theater system, audio system, gaming system, and other devices. Further, certain devices may be intended to store or transfer media content, such as video and audio storage servers. Certain devices may perform multiple media functions. In some embodiments, the network devices may be co-located on a single local area network. In other embodiments, the network devices may span multiple network segments, such as through tunneling between local area networks. The entertainment network may include multiple data encoding and encryption processes.

In some embodiments, packet prioritization is provided for an interconnection network. In some embodiments, a data stream is separated into sub-streams based on a priority level for the data in each sub-stream, and a bandwidth is established for each sub-stream. In some embodiments, the bandwidth of each sub-stream is based on the priority of the data in the sub-stream. In some embodiments, the highest priority data sub-stream is provided with the smallest bandwidth, and the lowest priority data sub-stream is provided with the largest bandwidth. In some embodiments, the sub-streams may be modified dynamically to respond to changing stream characteristics and maintain the relative bandwidths between the sub-streams.

During periods of network congestion, transmitted data packets may be dropped. If multiple data streams are active, it is common for data streams with larger bandwidth to be dropped first by the network infrastructure. For example, this operation may commonly occur in networks with commodity Ethernet switches or similar devices. In some embodiments, the bandwidth of sub-streams may be used to implement the order of priority in the network according to the packet priorities. In some embodiments, packet priorities thus may be used to affect which packets are dropped in a congested network.

In an example, an encrypted audio/video stream may be transmitted from a first network device to a second network device. The data stream may include various different types of data with varying priority levels based on how the loss of data will affect the resulting output. In some embodiments, data packets containing key material may be assigned the highest priority, followed by packets containing audio data (since humans have the least tolerance for audio artifacts), then followed by packets containing data for key video frames from which other frames are predicted, and then followed by packets containing predicted video frame data.

In some embodiments, extra frames, such as null frames having the lowest priority, may be added to the stream, with the null frames being dropped first. The dropping of null frames has no deleterious effects on the quality of the audio/video presentation since these packets form no part of the presentation. In some embodiments, an application may detect losses in a low-priority null sub-stream and take action to reduce its bandwidth before the presentation degrades. If an audio/video stream employs a hierarchical encoding scheme, the stream may continue at a lower bandwidth. In another approach, a data stream could be stopped completely if a degradation in service occurs, under the premise that other active streams could continue without interruption, rather than degrade all streams uniformly.

Although conventional networking devices generally do not support packet-based prioritization, networking devices commonly do recognize data flows. Such devices generally identify flows by an active stream of packets between a source and destination, which are distinguished by an address for the endpoint (e.g., an IP address) and a selector address within the endpoint (e.g., a UDP or TCP port number). Under periods of contention, devices that recognize data flows in this fashion generally adopt the policy of preferentially dropping packets from the recognized flow with the highest bandwidth.

Thus, in some embodiments, a network operates to provide bandwidths for data packets that are inversely related to the priority level of the data packers, with the highest bandwidth being accorded to lowest priority data packets and the highest bandwidth being accorded to the highest priority data packets. In some embodiments, a data flow is decomposed into separate sub-flows such that the highest priority packets occupy the lowest bandwidth sub-flow(s) and the lowest priority packets occupy the highest bandwidth sub-flow(s). In some embodiments, the operation of the network utilizing flow-based prioritization is leveraged to effectively prioritize the different elements of a particular data flow.

In some embodiments, the separation of data streams into sub-streams and establishment of bandwidths for such sub-streams may be maintained dynamically. Data stream characteristics may change often, and thus the characteristics of the sub-streams that are generated from the data stream will also change. In some embodiments, the sub-streams may be modified based at least in part on changes to the data stream. In some embodiments, the sub-streams may be modified as needed to maintain the relative bandwidth relationships for the sub-streams representing each priority level of data through the life of the data stream. Modification to the sub-streams may include, but is not limited to, modifying the bandwidth for any sub-stream, separating sub-streams into smaller sub-streams, combining sub-streams into larger sub-streams, generating new sub-streams, or eliminating existing sub-streams.

In an example, an encrypted audio/video stream is transmitted in a network. Typically, such a data stream would be transmitted to a receiver at a particular IP address and at a single port. In some embodiments, the transmitter instead delivers the stream to the same IP address but split across a series of ports. In some embodiments, each sub-stream (which may be, for example, key data, audio data, key video frame data, or predicted video frame data) would be transmitted on a different port. In some embodiments, sub-streams may be padded with null packets to ensure that the bandwidth between sub-streams increases as priority decreases. For example, predicted video data may require lower bandwidth than the key frame video data for a particular data stream, but the lower priority of predicted video data implies that a larger bandwidth is needed. In some embodiment, the predicted video frame data sub-stream is padded with extra packets. In some embodiments the extra packets include null packets. In some embodiments sufficient extra packets are included to maintain the needed bandwidth of a sub-stream.

However, simply padding sub-flows with lower priority data to occupy greater bandwidth than higher priority sub-flows may result in unacceptable overall bandwidth usage. To alleviate this situation, in some embodiments the transmitting device may decompose the data flow into sub-flows using bandwidth quanta that yield acceptable bandwidth usage when padding is necessary. In one example, a video stream may be decomposed into 1 Mb/s sub-streams that contain key frame data and 1.5 Mb/s sub-streams that contain predicted frame data. In one approach, the determination may work backward from the bandwidth requirement of the lowest priority sub-flow. In some embodiments, when a lower priority sub-flow requires less bandwidth than the next higher priority sub-flow, the higher priority sub-flow is decomposed into further sub-flows based on the bandwidth requirement of the lower priority sub-flow. Continuing the video stream example, if the sub-flow carrying the predicted frame data requires 6 Mb/s and the sub-flow carrying key frame data requires 15 Mb/s, the sub-flow carrying the key frame data could be decomposed into three sub-flows that each occupy 5 Mb/s of bandwidth. A variety of schemes to optimize the bandwidth usage while ensuring the strictly increasing bandwidth requirement for sub-flows of lower priority are possible.

In some embodiments, a device that receives data substreams at separate ports will determine that the data flows are portions of a single data stream. In some embodiments, the device will process such data flows in the same manner as if the data flows arrived as a single data stream. In some embodiments, the device may drop or ignore any null data packets added to maintain the bandwidth of the sub-streams. In some embodiments, the device may utilize as needed any duplicate data packets or retransmitted data packets added to maintain the bandwidth of the data sub-streams.

In some embodiments, there are no limits on the number of priorities that can be used in system. In contrast, conventional packet-level priority schemes are limited to a small number of priority levels (which may be, for example, four or eight allowed priority levels). In some embodiments, a data flow can be decomposed into as many sub-flows as the application requires to achieve its prioritization requirements.

In come embodiments, a flow-based prioritization process allows an application to define the relative prioritization of packets within a particular data flow, whereas a packet-level prioritization generally applies priorities globally across all flows. In some embodiments, the proposed scheme can achieve a global prioritization if mutual agreement on the accepted bandwidth quanta is achieved. In some embodiments, a flow-base prioritization process does not require changes or enhancements to current networking infrastructure. If packet-level priority support were to become widespread, the proposed scheme could reduce flow padding requirements (wasted bandwidth) by making use of the available priority scheme, and would remain the only mechanism for intra-flow prioritization.

In some embodiments, flow-based prioritization is implemented without use of a central arbiter or server, and without coordination or communication between competing network elements. In some embodiments, flow-based prioritization is provided in networking environments in which the network entities that provide and receive data flows possess minimal resources. In some embodiments, flow-based prioritization is provided without requiring a distinguished service to be available for such operations.

Figure 1:
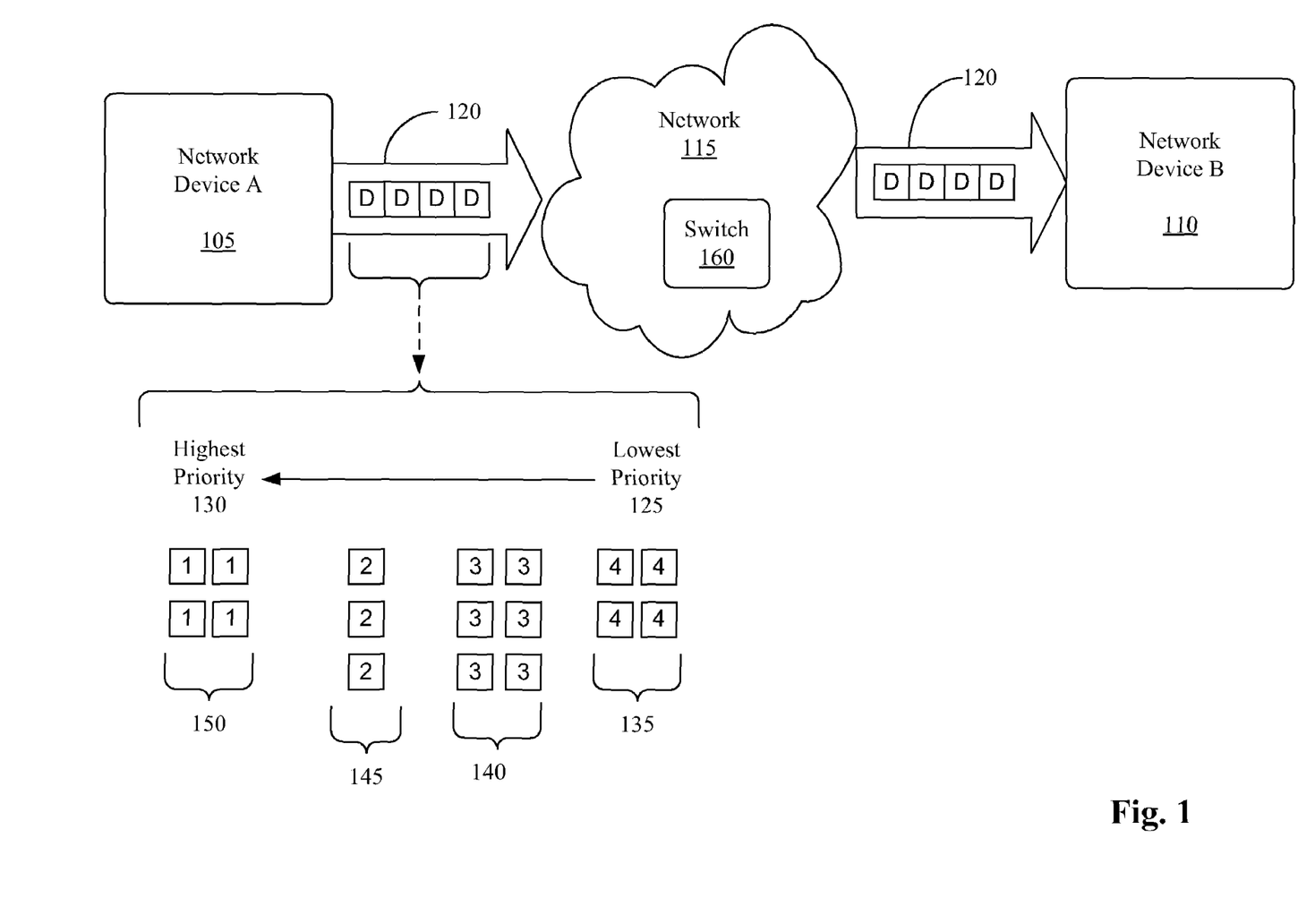
FIG. 1 is an illustration of embodiments of transmission of a data stream with data packet of varying priority.

FIG. 1 is an illustration of embodiments of transmission of a data stream with data packets of varying priority. In this illustration, network device A 105 is requested to transmit a data stream 120 via a network 115 to network device B 110. The data stream may include, but is not limited to, a media data stream. For example, network device A 105 may be a source of audio/video data (such as a set-top box or similar device) and network device B 110 may be a display device for audio/video data. The network 115 may include any number of intervening devices, including, for example a switch 160, which may be a commodity Ethernet switch.

The data stream 120 may include data packets of varying levels of priority, ranging from a lowest priority 125 to a highest priority 130. For example, there may be four groups of data packets, illustrated here as a priority level 4 group 135, a priority level 3 group 130, a priority level 2 group 145, and a priority level 1 group 150. If the network 115 does not recognize packet priorities and interference with other data traffic is encountered, then the data packets of data stream 120 will be dropped without regard to packet priority, or the full data stream 120 may be dropped.

In some embodiments, data stream 120 is decomposed into multiple sub-streams, with each sub-stream representing one or more of priorities of data packets. In some embodiments, the bandwidth of each sub-stream is inversely related to the priority level or levels of the data packets being transmitted in the sub-stream. For example, a sub-stream representing the lowest priority packets, such as a sub-stream for the priority level 4 group 135. Extra packets may be added as needed to maintain the bandwidth of each sub-stream.

However, the required bandwidth for priority level 3 group 140 would appear to be greater than the required bandwidth for priority level 4 group 135. In some embodiments, priority level 3 group 140 may be separated into multiple sub-streams, rather than increasing the bandwidth required for the lower priority group. Other divisions of sub-streams may also be made to establish bandwidths for each priority level that are inversely related to the level of priority. The resulting sub-streams may then be dropped in the order of priority by operation of the network infrastructure if needed, such as by operation of the switch 160 or other devices in transferring data.

Figure 2A:
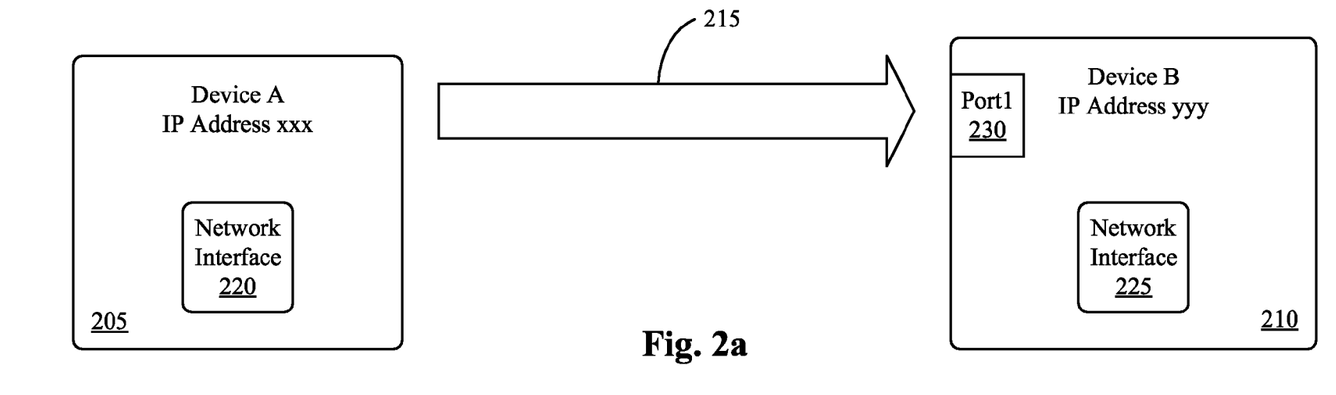
FIG. 2a is an illustration of embodiments of network devices to transfer a data stream containing data of varying priorities.

FIG. 2a is an illustration of embodiments of network devices to transfer a data stream containing data of varying priorities. In this illustration, a device A at IP address xxx 205 utilizes a network interface to transmit a data stream 215 to a device B at IP address yyy 210, which receives the data stream utilizing network interface 225. The data stream 215 may be, for example, a media data stream containing multiple data types of varying priority levels.

The data stream 215 would normally be directed to one port, port1 230, at IP address yyy. However, in some embodiments the data stream is divided into multiple data streams, which may be directed to separate ports of the receiving device.

Figure 2B:
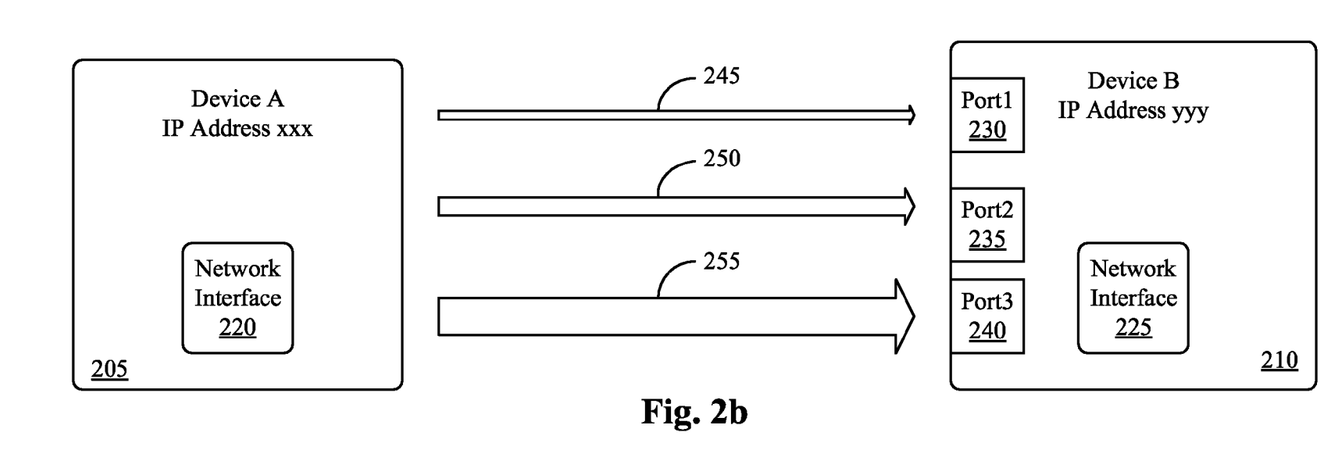
FIG. 2b is an illustration of embodiments of network devices to transfer multiple data streams representing data priorities.

FIG. 2b is an illustration of embodiments of network devices to transfer multiple data streams representing data priorities. As illustrated, the data stream 215 from device A 205 illustrated in FIG. 2a has been divided into data sub-streams 245, 250, and 255. In some embodiments, the data streams are directed to separate ports of device B, here illustrated as sub-stream 245 directed to port1 230, sub-stream 250 directed to port2 235, and sub-stream 255 directed to port3 240 at IP address yyy. In some embodiments, device B will determine that sub-streams 245, 250, and 255 are portions of a single data stream, and will process such sub-streams in the same manner as if the sub-streams arrived as a single data stream.

Figure 3:
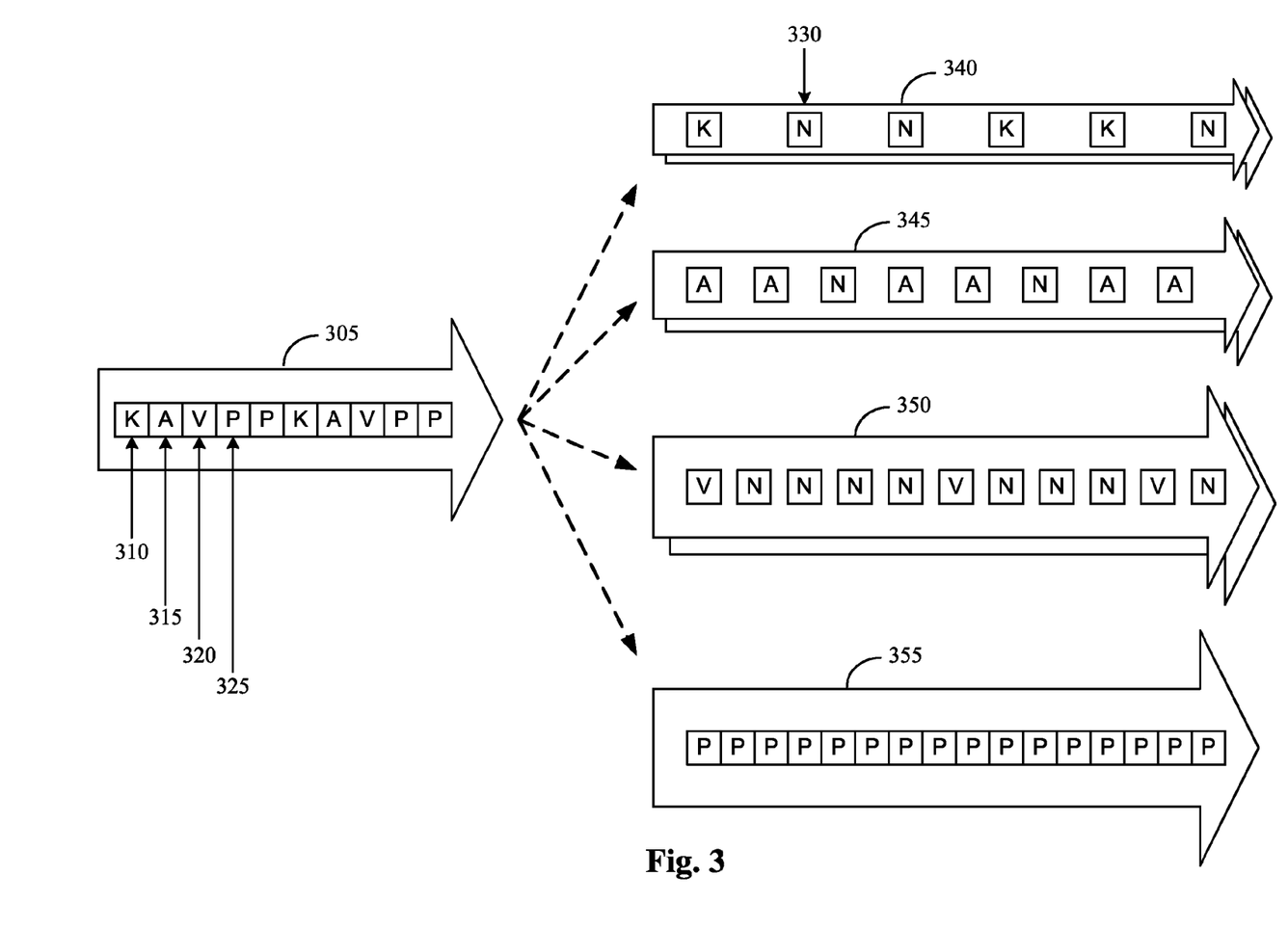
FIG. 3 is an illustration of packet prioritization for data packets of a media data stream.

FIG. 3 is an illustration of packet prioritization for data packets of a media data stream. A media data stream 305 includes data packets containing key material 310, which is assigned the highest priority, followed by packets containing audio data 315, then followed by packets containing data for key video frames from which other frames are predicted 320, and then followed by packets containing predicted video frame data 325. (The order and number of packets illustrated in FIG. 3 is for illustrative purposes only, and is not meant to represent the packets transferred in a data stream.)

In some embodiments, the media data stream may be divided into at least four data sub-steams, with each type of data being represented by one or more sub-streams. In this illustration, the data packets containing key material 310 are transmitted in the lowest bandwidth in one or more sub-streams 340, which may be packed with one or more null data packets 330 to establish the needed bandwidth. Packets containing audio data 315 are then contained in one or more sub-streams of greater bandwidth 345, followed by packets containing data for key video frames from which other frames are predicted 320 transmitted in one or more sub-streams 350. Finally, the packets containing predicted video frame data 325 are contained in one or more data streams 355 of the widest bandwidth. In an embodiment, the excess bandwidth may be eliminated by basing the bandwidths of higher priority data packets on the minimum required bandwidth for the lowest priority data packets 355.

Figure 4:
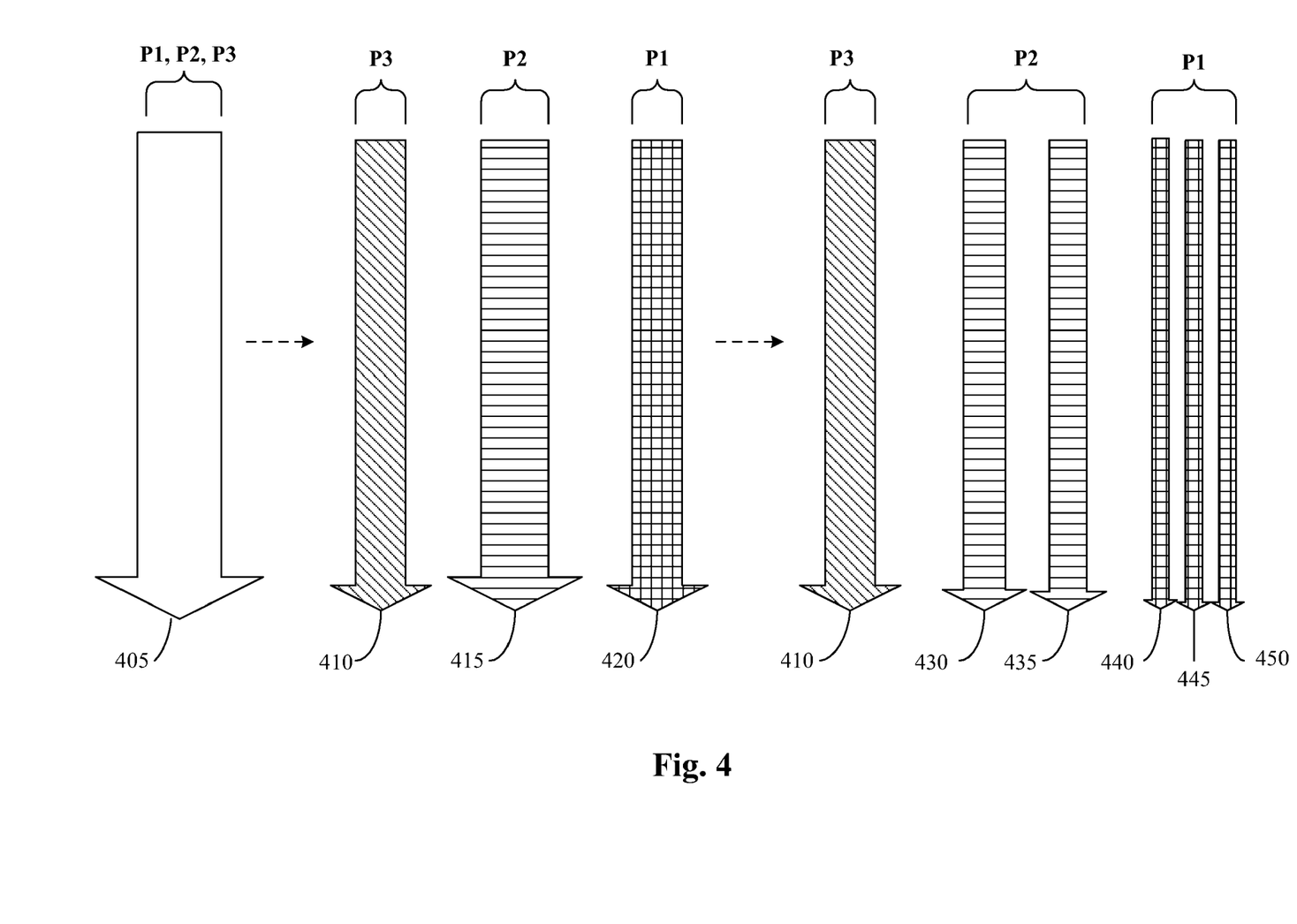
FIG. 4 illustrates embodiments of decomposition of data streams to establish packet level priority.

FIG. 4 illustrates embodiments of decomposition of data streams to establish packet level priority. In this illustration, a data stream 405 may include any number of priority levels of data, including, for example, P1, P2, and P3. The data stream 405 is decomposed into three sub-streams, sub-stream 410 for P3, sub-stream 415 for P2, and sub-stream 420 for P1. However, the resulting bandwidths do not represent the priority levels of the data packets.

To provide for packet level prioritization, the bandwidth of the P3 sub-stream 410 may be used to establish the bandwidths of the other sub-streams. In this example, sub-stream 410 is not modified, while sub-stream 415 is divided into sub-streams 430 and 435, each with a bandwidth less than the bandwidth of sub-stream 410. Sub-stream 420 then has a bandwidth that is too large, and is thus divided into sub-streams 440, 445, and 450, each with a bandwidth that is less than the bandwidth of sub-stream 430 and 435. Extra data packets, such as null packets, duplicate packets, or retransmitted packets, may be inserted as necessary to establish the required bandwidth. This process could continue to any number of priority levels, with the final bandwidth of each sub-stream being smaller than the bandwidth of the next lower priority sub-stream. In some embodiments, the sub-streams 410-450 may be modified dynamically to respond to any changes in the data stream 405 and to maintain the relative bandwidth relationships between the priority levels.

Figure 5:
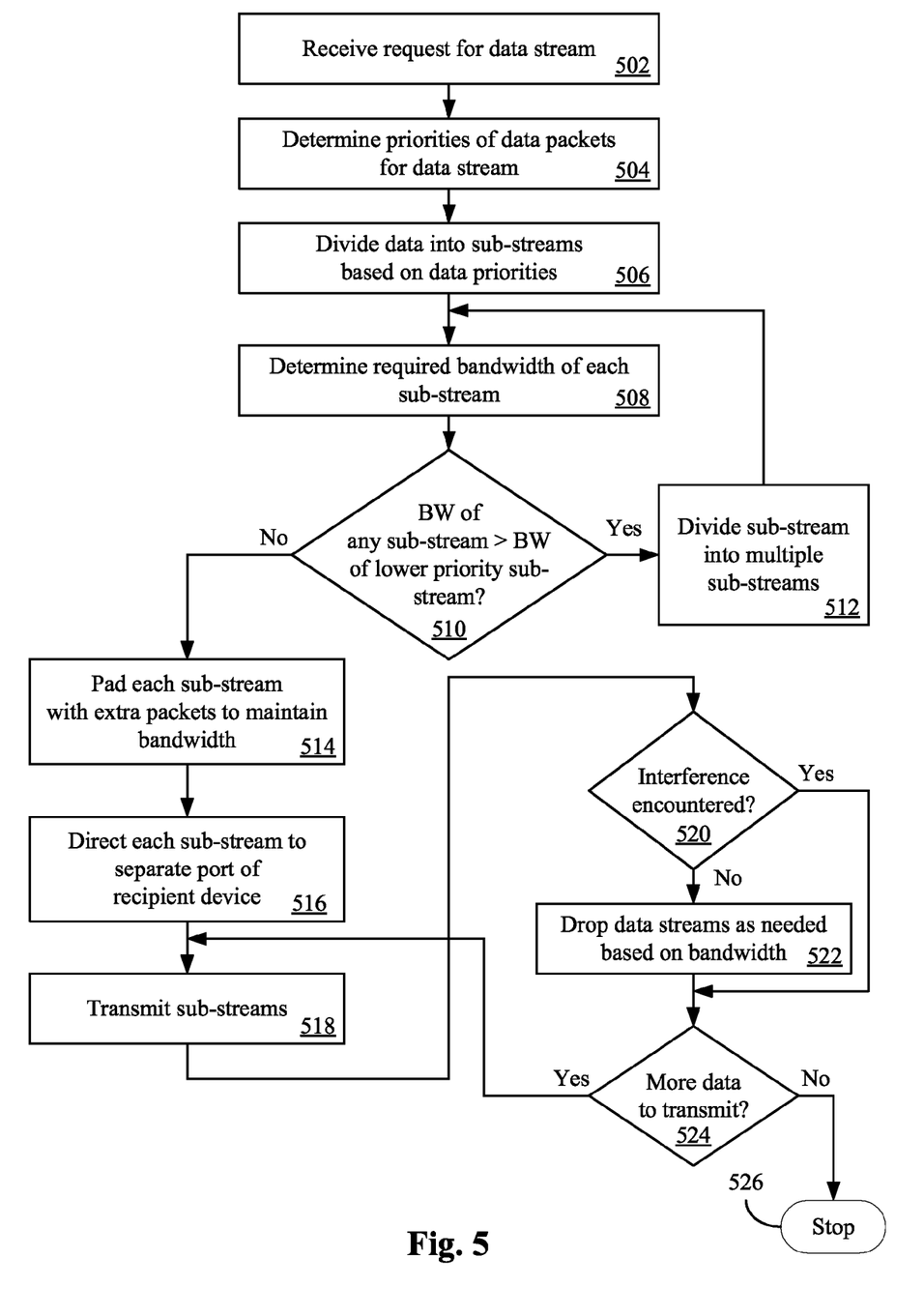
FIG. 5 is a flowchart to illustrate embodiments of processes for packet prioritization of data sub-streams.

FIG. 5 is a flowchart to illustrate embodiments of processes for packet prioritization of data sub-streams. As illustrated, a request for transmission of a data stream is received 502. A determination is made regarding what priorities of data packets may be present in the data stream 504. The data is divided into sub-streams based on the data priorities 506. The required bandwidth is determined for each of the sub-streams 508.

There is a determination whether the bandwidth of any sub-stream is greater than the bandwidth of a lower priority sub-stream 510. In some embodiments, the process may begin with the required bandwidth of the lowest priority data type, which is compared to the required bandwidth of the next higher priority. If it is determined that the bandwidth of any sub-stream is greater than the bandwidth of a lower priority sub-stream then such sub-stream with excess bandwidth is divided into multiple sub-streams 512, and the process of determining bandwidth continues 508.

When the sub-streams have been divided as necessary, each resulting sub-stream is padded with extra data packets as need to provide the needed bandwidth 514, and each sub-stream is directed to a separate port of the recipient device 516 and the transmission of the sub-streams commences 518.

If interference is encountered in the network, the data streams may be dropped as needed based on the bandwidth, with higher bandwidth streams being dropped first. This process may preserve higher priority data, which is being carried in lower bandwidth streams. The process continues while there is more data to transmit 524, and ends when the data streams are ended 526.

Figure 6:
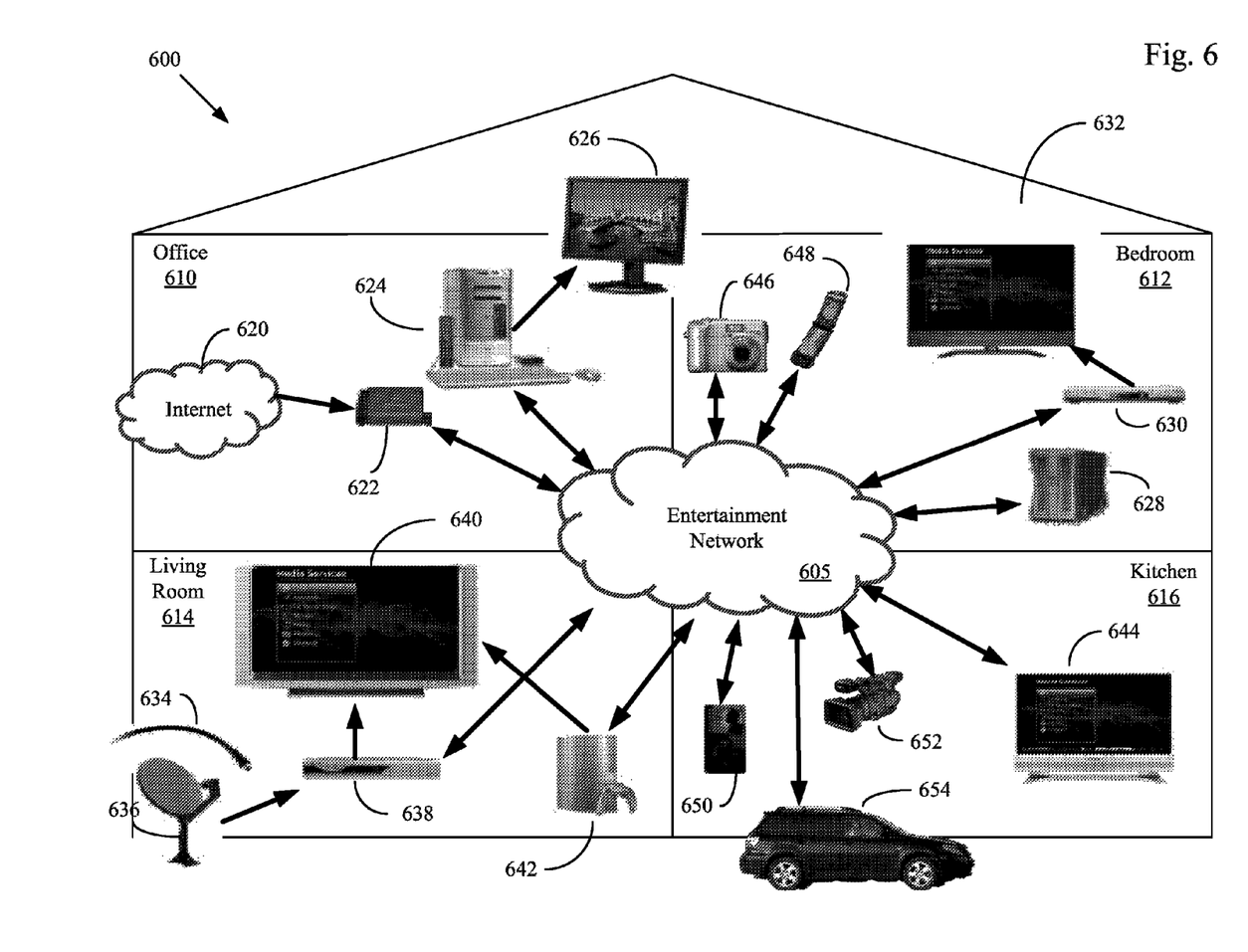
FIG. 6 is an illustration of embodiments of an entertainment network.

FIG. 6 is an illustration of embodiments of an entertainment network. In this illustration, the entertainment network system 600 provides for the connection of any compatible media device to the network. The connection is shown as a connection to entertainment network 605. In some embodiments, the devices operate as network without a central network server. Through the entertainment network, media data streams may be transferred between any of the connected devices. In addition, devices may be controlled remotely through the network. The devices may be connected to the network via any known connector and connection protocol, including coaxial cables, Ethernet cables, and Firewire, and wireless connections via Wi-Fi, Bluetooth, and other wireless technologies.

In some embodiments, the devices may include any media sources or recipients. In FIG. 6, an office 610 may provide an Internet connection 620 via a modem 622 to the network 605. The data received from the Internet may include any streaming media sources, including, but not limited to, purchased audio files (such as downloaded music files), video files (such as movies, television, and other), and computer games. The office 610 may also be connected to a personal computer 624 that utilizes a monitor 626, which may, among other functions, display certain media streams or operate certain computer games.

The entertainment network may also be connected with devices in a bedroom 612, which may, for example, contain a set top box 630 to provide data to a television 632. In addition, the bedroom (or any other space) may contain a media storage unit 628. The media storage unit 628 may receive data from any source connected to the network 605, and may provide to any data recipient connected to the network 605. The media storage unit 628 may contain any type of media stream data for the network.

The system may further include a living room 614 receiving, for example, input from a cable or fiber system 634 or from a satellite disk network 636. The media input from such sources may be provided to a set top box 638 connected to the network 605 and to a second television 640. Also connected to the network 605 for display on the living room television 640 may be a video game unit 642. There may be any number of other rooms with networked devices, such as a kitchen containing a third television 644 connected to the network 605. Other network devices may also be present, including, but not limited to, a stereo audio system that may include speakers placed throughout the house.

In addition, any number of mobile personal electronic devices may connect to the network. The devices may connect via a cable or via a wireless signal, including, but not limited to, Bluetooth, Wi-Fi, infrared or other similar wireless communication protocol. Each such protocol may require an interface to the network (which are not shown in FIG. 6), such as a Wi-Fi base station. Such mobile personal electronic devices could include a digital camera 646, a cellular telephone 648, a personal music device 650, or a video camera 652. In addition, a mobile system contained in an automobile 654 may connect to the network 605 when the automobile is in close proximity to the network (such as when present in a garage of the house). The mobile personal electronic devices may, for example, automatically connect to the network when within range of the network. While connected, the devices may be available to obtain data through the network or to provide data to the network, including possible automatic updates or downloads to the devices. In one example, a user may be able to access the data contained in any of the mobile electronic devices through the network, such as accessing the photographs stored on the digital camera 646 on the living room television 640 via the set top box 638. In some embodiments, the network devices illustrated in FIG. 6 are low resource devices that have been designed with limited network processing and buffering capabilities.

Figure 7:
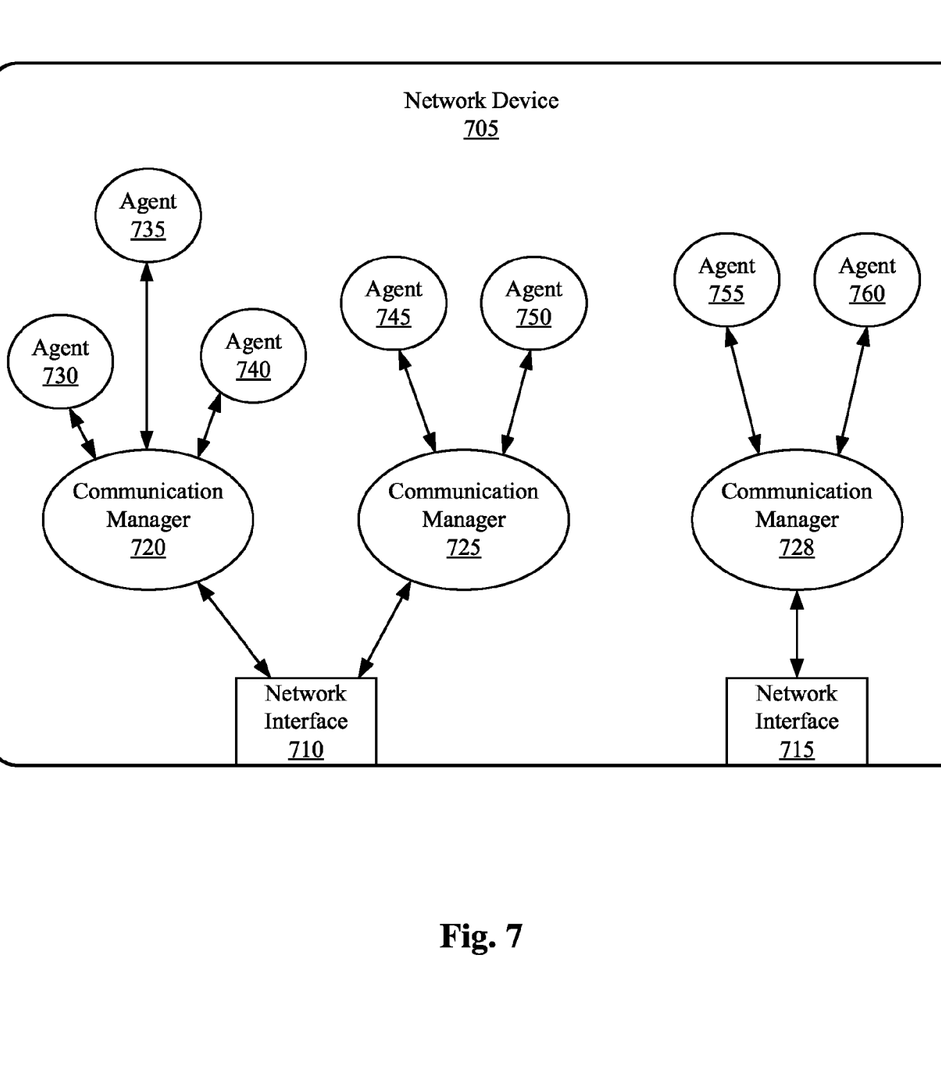
FIG. 7 is an illustration of embodiments of a network device.

FIG. 7 is an illustration of embodiments of a network device. In some embodiments, a network device 705 is an entity with at one physical network interface, such as an Ethernet MAC address. As illustrated in FIG. 7, the network device includes two network interfaces 710 and 715. In some embodiments, network device thus is a physical entity. In some embodiments, the network device includes one or more agents, with each agent being a logical entity that resides on a network device. There may be multiple agents on a network device. For example, FIG. 7 illustrates a network device 705, with network interface 710 providing access to agents 730, 735, and 740 via communication manager 720 and agents 745 and 750 via communication manager 725, and providing access to agents 755 and 760 via communication manager 730. In some embodiments, each agent is assigned a globally unique identifier to distinguish it from other agents, independent of the network device IP address and across device reset operations. In this manner, a command that is intended for agent 755 may be addressed to the unique address for the agent, and the message will then be directed through network interface 715 to agent 755.

In some embodiments, agents serve as endpoints of communication within a network device, and provide a particular set of capabilities and associated behaviors. Agents may include media sources, media sinks, media controllers, and other elements. In one example, an agent may provide a video streaming service. In this example, the agent responds to messages to query and control media streams, and, when instructed, the agent may autonomously deliver a media stream to another agent. In some embodiments, an agent has no more than one active media session at any time, thus providing for relatively simple operation. An agent may be viewed may be described as acting as an active object in that the agent may send and receive messages, modify internal state in response to such messages, and have the ability to perform continuous actions as a side effect.

In some embodiments, an agent may communicate on an entertainment network by way of a communication manager. In some embodiments, there may be one or more communication managers per device, such as communication managers 720, 725, and 730 in FIG. 7. In some embodiments, multiple agents may be managed by a single communication manager, such as, for example, agents 730, 735, and 740 being managed by communication manager 720. In some embodiments, a communication manager is responsible for routing messages to and from the agents that are bound to the communication manager. The process may include delivering messages to other agents that are local to the same network device, multiplexing messages from individual agents onto outgoing connections to agents on remote network devices, and handling broadcast requests. In some embodiments, an agent may be bound to only one communication manager, and a communication manager may be bound to only one network interface.

In some embodiments, a display manager is an agent that manages the resources on a display device. Specifically, the display manager is responsible for granting access to the display resources and screen geometry. In some embodiments, each display device has only one display manager for each related set of I/O devices, such as video output, graphics output, audio output, and user input. In some embodiments, the agent works with a session manager to coordinate the delivery and display of media content at the display device, granting access to the display device resources. In some embodiments, a display manager represents the starting point for a user session and delegate controls to a session manager.

In some embodiments, a session manager is an agent that coordinates a set of media content for an active user. In some embodiments, once selected, a session manager initiates a remote on-screen display session with the corresponding display manager and begins to execute an application program to manage other devices in the network. In some embodiments, a display manager forwards input events to the session manager and grants access rights to its display resources, which a session manager can delegate to other agents, thus allowing the other agents to deliver content to the display. In one example, a display manager may grant access rights to a session manager that executes within a set-top box. The session manager may initiate a remote UI (user interface) session with the display, and allows the user of the network device to select a video to be played from a remote video storage device. In some embodiments, the session manager may pass access rights to a video server, and direct the video server to deliver a media stream to the display. In some embodiments, session managers maintain the states necessary to manage a user's experience in utilizing media content.

Figure 8:
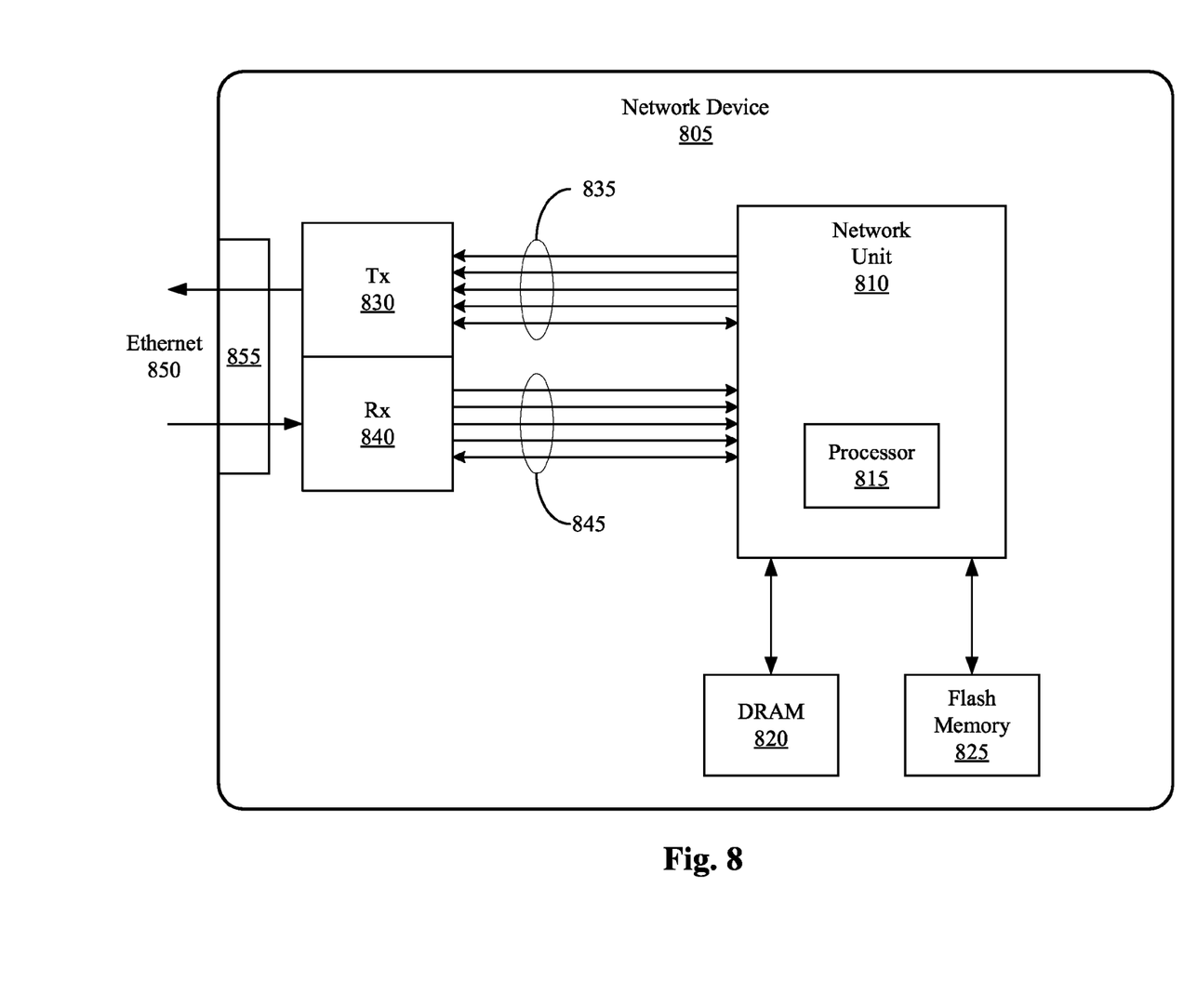
FIG. 8 is an illustration of embodiments of components of a network device.

FIG. 8 is an illustration of embodiments of components of a network device. In this illustration, a network device 805 may be any device in an entertainment network, including, but not limited to, devices illustrated in FIG. 1. For example, the network device may be a television, a set top box, a storage unit, a game console, or other media device. In some embodiments, the network device 805 includes a network unit 810 to provide network functions. The network functions include, but are not limited to, the generation, transfer, storage, and reception of media data streams. The network unit 810 may be implemented as a single system on a chip (SoC) or as multiple components.

In some embodiments, the network unit 810 includes a processor for the processing of data. The processing of data may include the generation of media data streams, the manipulation of media data streams in transfer or storage, and the decrypting and decoding of media data streams for usage. The network device may also include memory to support network operations, such as DRAM (dynamic random access memory) 820 or other similar memory and flash memory 825 or other nonvolatile memory.

The network device 805 may also include a transmitter 830 and/or a receiver 840 for transmission of data on the network or the reception of data from the network, respectively, via one or more network interfaces 855. The transmitter 830 or receiver 840 may be connected to a wired transmission cable, including, for example, an Ethernet cable 850, or to a wireless unit. The transmitter 830 or receiver 840 may be coupled with one or more lines, such as lines 835 for data transmission and lines 845 for data reception, to the network unit 810 for data transfer and control signals. Additional connections may also be present. The network device 805 also may include numerous components for media operation of the device, which are not illustrated here.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a computer-readable medium having stored thereon computer program instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. An apparatus comprising:
   a transmitter configured to transmit a data stream, the data stream including a plurality of data packets, the data packets including data packets of a first priority and data packets of a second priority; and
   a network unit configured to direct the operation of the transmitter, the network unit being configured to divide the data stream into a plurality of sub-streams based on a priority level for the data in each sub-stream, the plurality of sub-streams including a first sub-stream for data packets of the first priority and a second sub-stream for data packets of the second priority;
   wherein the first priority is higher than the second priority, and wherein the network unit is to establish bandwidths for the sub-streams such that a bandwidth for the data packets of the second priority that is larger than a bandwidth for the data packets of the first priority, the apparatus operating in a network having an infrastructure that drops larger bandwidth data streams before smaller bandwidth data streams; and
   wherein establishing bandwidths includes the network unit dividing the first sub-stream into a plurality of sub-streams if an amount of bandwidth required to transmit the data packets of the first priority is larger than an amount of bandwidth that is required for data packets of the second priority, wherein each of the plurality of sub-streams resulting from the division of the first sub-stream has a bandwidth that is lower than a bandwidth of the second data sub-stream.

2. The apparatus of claim 1, wherein establishing bandwidths includes padding one or more sub-streams with extra data packets to maintain the bandwidth for the sub-stream.

3. The apparatus of claim 2, wherein the extra data packets include null data packets.

4. The apparatus of claim 2, wherein the extra data packets include retransmitted data packets, duplicate data packets, or both retransmitted and duplicate data packets.

5. The apparatus of claim 1, wherein the network unit is further configured to modify the data sub-streams dynamically based at least in part on a change to the data stream.

6. The apparatus of claim 1, wherein each of the plurality of sub-streams is directed to a different port of a recipient device.

7. The apparatus of claim 1, wherein the data stream is a media data stream.

8. A network comprising:
   a first network device to transmit data, the data comprising a plurality of data packets, the first network device to divide the data into a plurality of data streams according to a priority of data in each data stream, one or more of the data packets being of a first priority and one or more of the data packets being of a second priority, the first network device to transmit the data packets of the first priority in one or more data streams having a first bandwidth and to transmit the data packets of the second priority in one or more data streams having a second bandwidth, wherein the first priority is higher than the second priority and wherein the second bandwidth is larger than the first bandwidth; and
   a second network device to receive the data streams from the first network device, the second network device to drop one or more data streams based at least in part on the bandwidth of each data stream when interference occurs in data transmission, wherein the second network device is to drop larger bandwidth data streams before smaller bandwidth data streams;

wherein the first network device is to divide a first data stream into a plurality of sub-streams if a required bandwidth of the first data stream is greater than a required bandwidth of a second data stream containing lower priority data, wherein each of the plurality of sub-streams resulting from the division of the first data stream has a bandwidth that is lower than a bandwidth of the second data stream.

9. The network of claim 8, wherein the first network device is a source of digital media data.

10. The network of claim 8, wherein the second network device is a device to transfer or use digital media data.

11. The network of claim 8, wherein the second network device comprises a switch, the second network device to drop the one or more data streams based at least in part on the bandwidth of each data stream via operation of the switch.

12. A method for prioritizing data packets in a network comprising:
 receiving a request for transmission of a data stream at a network device, the data stream containing a plurality of data types, each data type having a priority level;
 dividing the data stream into a plurality of data sub-streams based on a priority level for the data in each sub-stream utilizing a network unit of the network device, each sub-stream having data of a certain priority level;
 assigning by the network unit a bandwidth for each data sub-stream, the bandwidth of each sub-stream being based on the priority level of the data in the sub-stream, wherein the bandwidth assigned to each data sub-stream by the network unit is inversely related to the priority level of each data sub-stream;
 dividing by the network device a first data sub-stream into a plurality of sub-streams if a required bandwidth of the first sub-stream is greater than a required bandwidth of a second data sub-stream containing data with a lower priority level, wherein each of the plurality of sub-streams resulting from the division of the first data sub-stream has a bandwidth that is lower than a bandwidth of the second data sub-stream; and
 transmitting by the network device the plurality of data sub-streams over the network, wherein the infrastructure of the network provides for dropping data streams having higher bandwidth if interference occurs.

13. The method of claim 12, further comprising modifying the data sub-streams based at least in part on changes to the data stream.

14. The method of claim 12, wherein transmitting the plurality of data sub-streams includes padding by the network unit of one or more of the data sub-streams with additional data packets to maintain the assigned bandwidth of the data sub-streams.

15. The method of claim 14, wherein the additional data packets include one or more null data packets.

16. The method of claim 14, wherein the additional data packets include one or more retransmitted data packets, duplicate data packets, or both retransmitted and duplicate data packets.

17. The method of claim 12, wherein the network comprises a plurality of entertainment devices, the network device being a first entertainment device of the plurality of entertainment devices.

* * * * *